2,881,127
SEPARATION PROCESS

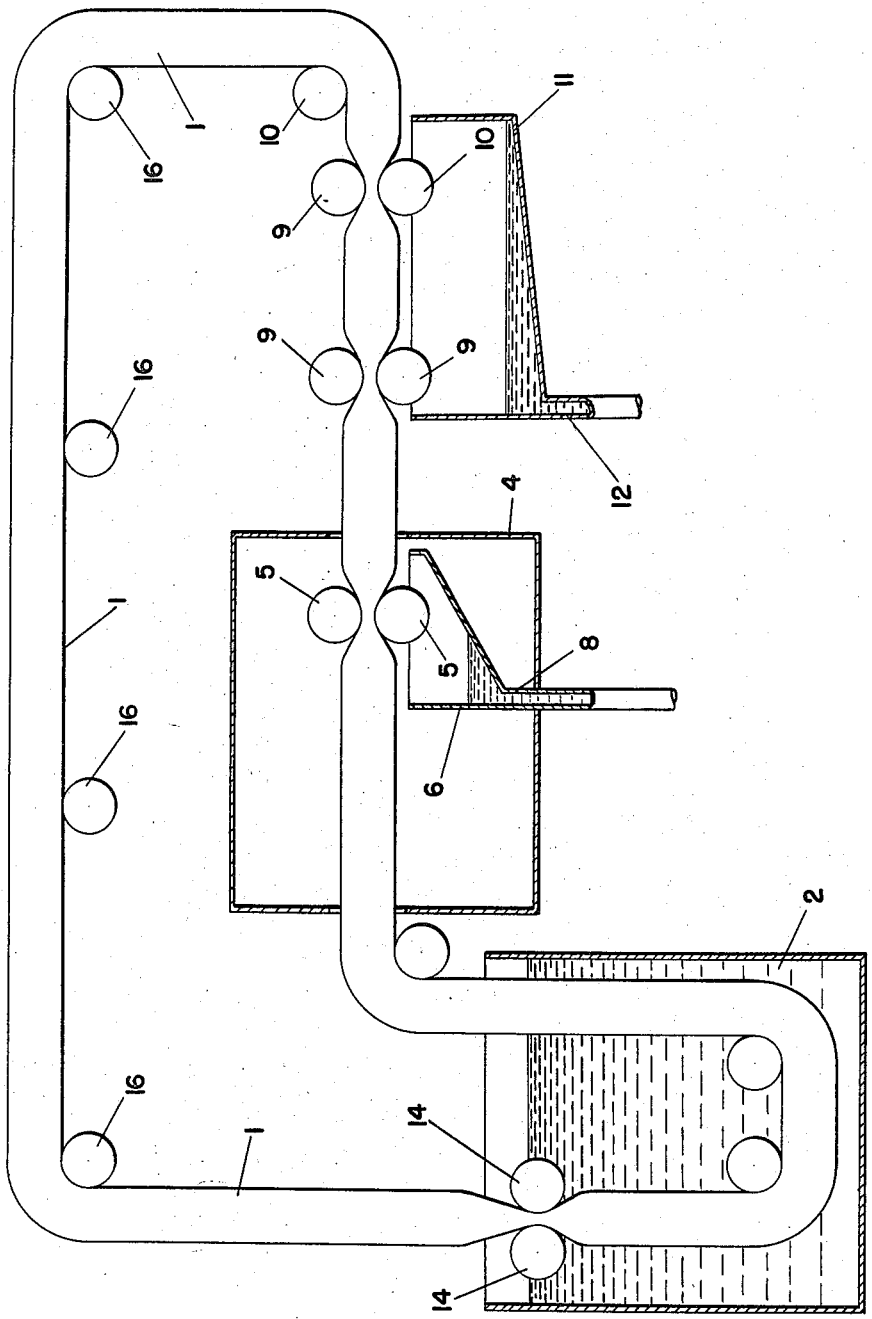

Stanford J. Hetzel, Cheltenham, Pa., assignor to Sun Oil Company, Philadelphia, Pa., a corporation of New Jersey Application December 30, 1955, Serial No. 556,512

8 Claims. (Cl. 208—26)

This invention relates to the separation of solids and liquids, and is more particularly directed to the separation of solids crystallized from a solution thereof.

Many processes chemical in nature require the separation of solids from liquids. Mixtures of solids and liquids have heretofore been separated by methods such as decanting, filtering, and centrifuging. Such processes, however, are not entirely satisfactory in one or more respects, e.g. in the length of time required for settling so that decanting can be used, in the building up of filter cakes which retards filtration, and by requiring expensive and complicated equipment necessary for centrifuging.

An object of the present invention is to provide a simple and rapid process for the separation of solids from liquids. Another object is to provide a process for the separation of solids crystallized from a solution thereof. A particular object of the invention is to provide a process for the separation of wax from oil. Other objects and their achievement in accordance with the invention appear hereinafter.

According to the invention, a solution of crystalline solid in a solvent therefor is absorbed into a spongy material. The spongy material is thereafter cooled. On cooling to an appropriate temperature, crystals of the solid material form in the interstices of the spongy material. While cool, the spongy material is pressed to remove the solvent therefrom. The solid is thereafter recovered from the interstices of the spongy material as hereinafter described.

The accompanying figure is an elevation view illustrating an embodiment of the invention and is hereinafter described.

The process of the invention is especially applicable for the separation of wax from oil and hence the following discussion is directed primarily thereto, but the process of the invention is limited only as hereinafter indicated.

Attention is now directed to the figure.

Numeral 1 represents a spongy material constructed in the form of an endless belt. Numeral 2 indicates a mixture of oil and wax at a temperature sufficient to maintain the wax in solution, and preferably at a temperature just above incipient crystallization of the wax. In operation, the endless belt moves through bath 2 wherein the solution is absorbed into the belt. The belt then passes into cold box 4. Cold box 4 is maintained at a temperature sufficiently low to cause crystallization of wax in the interstices of the belt. The belt then passes through rollers 5 which press oil therefrom, the oil falling into receptacle 6 and is recoverable through conduit 8. Rollers 5 are advantageously maintained at a temperature of at least as cold as the temperature in cold box 4. The belt then passes from cold box 4 and through hot rollers 9. The hot rollers are maintained at a temperature sufficiently high to melt the wax contained in the interstices of belt 1 so that molten wax is pressed from the belt. Auxiliary hot rollers 10, which may be a multiplicity of rollers, are provided if necessary or desirable to insure substantially complete removal of the wax from belt 1. Molten wax falls into receptacle 11 and is recovered through conduit 12. After wax removal the belt is returned to the process.

In operation, belt 1 should be submerged in bath 2 for a time sufficient for substantial saturation of the spongy belt with the bath liquid. Rollers 14 can be provided, if desired, to press the belt so that subsequent expansion thereof is beneath the liquid surface to assist the liquid in entering the interstices of the belt. The residence time of the belt in cold box 4 prior to pressing oil from the belt by rollers 5 should be sufficient to permit a temperature reduction of the solution contained in the interstices of the belt so that wax which is crystallizable at about the temperature of the cold box is substantially converted to solid form. Cold box 4 is maintained at a desired low temperature by circulating refrigerated air or other gaseous medium such as nitrogen or carbon dioxide therein. The incoming cold air is advantageously directed against the belt to assist in cooling.

In some instances it may be desirable to remove wax from the belt by means of a solvent rather than by hot rollers. Also, in some instances, the hot rollers are advantageously operated in a hot box to assist in melting wax contained in the interstices of the belt, or other supplementary means of heating wax in the interstices, such as by infra-red irradiation can be used. Supporting means such as rollers 16 can be provided where necessary or convenient.

By "spongy material," as used herein, is meant a material which readily absorbs liquids and which is resilient, i.e., after the material has been compressed, it returns to substantially its original shape on release of the pressure. Especially suitable spongy materials are foamed synthetic resins, such as foamed polyurethane and foamed polyvinylchloride. Other spongy materials may be used with good results, such as natural or synthetic foamed rubber, and certain fabrics such as wool. The spongy material must not be deleteriously affected by the materials which it contacts in the process.

As above mentioned, wax can be removed from the belt by means of solvents if desired. Suitable solvents include, for example, benzene, petroleum naphtha, trichloroethylene, carbon tetrachloride, mixtures thereof, and the like. It is important, however, that the spongy material be substantially unaffected by contact with the solvent used.

The dimensions of the endless belt will be determined largely by convenience in relation to the particular operation being used. The belt is advantageously, for example, from 6 to 40 inches thick and from 1 to 12 feet wide. The dimensions of the belt should be related to the time of immersion in the bath so that substantially complete saturation of the belt is achieved, and to the residence time in the cold box so that substantially crystallization of wax is achieved.

In order to illustrate the process of the invention, a waxy gas oil distillate fraction having a boiling range of from about 690° F. to 860° F. was heated to achieve a homogeneous solution of the wax in oil. A foamed polyurethane belt was passed into the solution. The foamed polyurethane absorbed about 56.4 pounds of solution per cubic foot. The polyurethane containing the wax-oil solution was then cooled to about 14° C. While at this temperature oil was recovered by contacting the polyurethane with a cooled metal press. There were recovered 17.9 pounds of oil from each cubic foot pressed. The recovered oil was free from wax which crystallizes at a temperature of 14° C. The polyurethane containing the wax crystals in its interstices was then heated and contacted with a heated metal press to remove wax therefrom. 33.3 pounds of a mixture of wax and oil were obtained from each cubic foot of polyurethane. A small quantity, about 5.2 pounds per cubic foot, remained in the polyurethane. The process was repeated using the recovered wax-oil mixture as the charge stock. The process was operated so that 33.3 pounds of the solution was absorbed per cubic foot of polyurethane. There were recovered about 15.2 pounds of oil, which has substantially wax free, and about 13.2 pounds of a hard wax per cubic foot of polyurethane. About 4.9 pounds per cubic foot remained in the polyurethane.

Other embodiments will be apparent to those skilled in the art. Thus, it is advantageous to recycle a part of the wax-oil mixture obtained by the first hot pressing to the process to further concentrate wax and to recover wax-free oil.

The process of the invention has been largely described in terms of separating wax from oil, but other solids can be separated from liquids with good results, especially solids which are crystallizable from the liquid. For example, naphthalene can be separated from homologues thereof such as the methylnaphthalenes and ethylnaphthalenes, and a toluic acid such as o-toluic acid, or a mixture of toluic acids, can be separated from a xylene such as m-xylene, or from a mixture of xylenes in accordance with the process of the invention.

The invention claimed is:

1. Process for separating solids from liquids with which the solids form solutions and from which the solids are crystallizable on cooling which comprises absorbing a solution of the solid in a spongy material, cooling the spongy material containing absorbed solution to crystallize at least a portion of the solid in the interstices of the spongy material, and pressing the spongy material to remove at least a portion of the liquid absorbed therein.

2. Process for separating solids from liqiuds with which the solids form solutions and from which the solids are crystallizable on cooling which comprises dissolving the solid in the liquid to form a solution, absorbing the solution in a spongy material, cooling the spongy material containing absorbed solution to crystallize at least a portion of the solid in the interstices of the spongy material, pressing the spongy material to remove at least a portion of the liquid absorbed therein, and recovering at least a portion of the solid from the spongy material.

3. Process for separating wax from oil which comprises absorbing a solution of wax in oil in a spongy material, cooling the spongy material containing absorbed solution to crystallize at least a portion of the wax in the interstices of the spongy material, pressing the cooled spongy material to recover oil therefrom, and recovering wax from the interstices of the spongy material.

4. Process for separating wax from oil which comprises absorbing a solution of wax in oil in a spongy endless belt by continuously passing the belt through the solution, cooling the belt containing absorbed solution to crystallize at least a portion of the wax in the interstices of the belt, cold pressing the belt to recover at least a portion of the oil therefrom, the recovered oil having a decreased wax content, recovering wax from the belt, and returning the belt to the process.

5. Process according to claim 4 wherein said endless belt is foamed polyurethane.

6. Process according to claim 4 wherein said endless belt is foamed polyvinylchloride.

7. Process for separating wax from oil which comprises absorbing a solution of the wax in oil in a spongy endless belt by continuously passing the belt through the solution, cooling the belt containing absorbed solution to crystallize at least a portion of the wax in the interstices of the belt, cold pressing the belt to recover at least a portion of the oil therefrom, the recovered oil having a decreased wax content, hot pressing the belt to recover molten wax therefrom, and returning the belt to the process.

8. Process for separating wax from oil which comprises absorbing a solution of the wax in oil in a spongy endless belt by continuously passing the belt through the solution, cooling the belt containing absorbed solution to crystallize at least a portion of the wax in the interstices of the belt, cold pressing the belt to recover at least a portion of the oil therefrom, the recovered oil having a decreased wax content, introducing a wax solvent into the belt to dissolve wax therein, removing solvent containing dissolved wax from the belt, and returning the belt to the process.

References Cited in the file of this patent

UNITED STATES PATENTS

| | | |
|---|---|---|
| 736,596 | Grondahl | Aug. 18, 1903 |
| 2,194,185 | Padgett | Mar. 19, 1940 |
| 2,614,102 | Schlosser et al. | Oct. 14, 1952 |
| 2,678,132 | Beard | May 11, 1954 |
| 2,713,022 | Dole et al. | July 12, 1955 |